United States Patent
Leslie et al.

(10) Patent No.: US 9,845,702 B2
(45) Date of Patent: Dec. 19, 2017

(54) STATOR DAMPER

(71) Applicant: United Technologies Corporation, Hartford, CT (US)

(72) Inventors: Nicholas R. Leslie, South Berwick, ME (US); David P. Dube, Saco, ME (US); Randall J. Butcher, Newington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 581 days.

(21) Appl. No.: 14/697,242

(22) Filed: Apr. 27, 2015

(65) Prior Publication Data
US 2016/0312800 A1 Oct. 27, 2016

(51) Int. Cl.
| | | |
|---|---|---|
| F01D 25/06 | (2006.01) | |
| F04D 29/66 | (2006.01) | |
| F01D 25/04 | (2006.01) | |
| F01D 25/24 | (2006.01) | |
| F04D 29/52 | (2006.01) | |
| F04D 29/64 | (2006.01) | |

(52) U.S. Cl.
CPC ............ *F01D 25/06* (2013.01); *F01D 25/04* (2013.01); *F01D 25/246* (2013.01); *F04D 29/522* (2013.01); *F04D 29/644* (2013.01); *F04D 29/668* (2013.01); *Y02T 50/672* (2013.01)

(58) Field of Classification Search
CPC .... F04D 29/668; F04D 29/522; F04D 29/644; F01D 5/10; F01D 5/16; F01D 5/22; F01D 5/225; F01D 5/26; F01D 25/04; F01D 25/06; F01D 25/246; Y02T 50/672
See application file for complete search history.

(56) References Cited

U.S. PATENT DOCUMENTS

| | | | | |
|---|---|---|---|---|
| 4,897,021 A | * | 1/1990 | Chaplin | F01D 5/22 267/160 |
| 5,188,507 A | | 2/1993 | Sweeney | |
| 7,938,407 B2 | * | 5/2011 | Datta | F16J 15/0887 277/644 |
| 8,147,191 B2 | * | 4/2012 | Baumhauer | F01D 9/041 415/209.3 |

(Continued)

FOREIGN PATENT DOCUMENTS

| | | |
|---|---|---|
| EP | 1591725 | 11/2005 |
| EP | 2613021 | 7/2013 |
| GB | 2219355 | 12/1989 |

OTHER PUBLICATIONS

Extended European Search Report dated Aug. 1, 2016 in European Application No. 16167078.1.

*Primary Examiner* — Dwayne J White
*Assistant Examiner* — Sang K Kim
(74) *Attorney, Agent, or Firm* — Snell & Wilmer, L.L.P.

(57) ABSTRACT

A stator damper is disclosed. The stator damper has a body section and a damper finger. The body section rests against a stator assembly and a portion of each damper finger rests against a compressor casing. The stator damper is radially compressed between the stator assembly and the compressor casing. Thus, the stator damper exerts a radial force against the stator assembly. In this manner, relative motion of the stator assembly is damped.

19 Claims, 9 Drawing Sheets

(56) References Cited

U.S. PATENT DOCUMENTS

| | | | |
|---|---|---|---|
| 8,920,112 B2* | 12/2014 | Ring | F01D 25/04 |
| | | | 415/119 |
| 9,506,361 B2* | 11/2016 | Fielding | F01D 9/041 |
| 2012/0195745 A1 | 8/2012 | Kapala | |
| 2014/0125014 A1* | 5/2014 | Panchal | F16J 15/3284 |
| | | | 277/550 |
| 2014/0241874 A1 | 8/2014 | Rioux | |
| 2016/0281531 A1* | 9/2016 | Dube | F01D 25/04 |

* cited by examiner

STATOR DAMPER

FIELD

The present disclosure relates generally to a gas turbine engine, and more specifically, to a stator damper for gas turbine engines.

BACKGROUND

In the compressor of a gas turbine engine, stators typically are formed with close tolerance between the outer diameter of the stators and the compressor casing of the gas turbine engine. However, cantilevered stators introduce additional spacing between the outer diameter of the stators and the compressor casing. As a result, gas may leak around the outer diameter of the cantilevered stators, negatively affecting engine performance. Moreover, mechanical movement of the cantilevered stators relative to the compressor casing may be desired to be damped and additional load bearing surface(s) between the stators and the compressor casing may be desired to be provided, such as to reduce wear and improve engine life.

SUMMARY

A stator damper is disclosed. The stator damper includes a body section having an annular cylinder section, and a damper finger extending radially outward from the body section. The damper finger includes an axially extending section having a flange extending axially aft from the body section, and a radial clip portion having a flange extending from an axially aft most end of the axially extending section according to a first clip angle. The damper finger is loaded in compression against a compressor casing of the gas turbine engine. The stator damper exerts a radial force along a path radially inward from the compressor casing through a stator assembly of the gas turbine engine, whereby relative motion (such as radial excursions) of the stator assembly are damped. The first clip angle is an acute angle. The axially extending section is coplanar with the body section. The stator damper includes a sealing member having an annular cylinder section radially inward of and co-axial with the body section and attached to the body section.

The damper finger also includes a contact flange having an annular flange disposed at a radially outermost end of the radial clip portion and concentric with the body section. The contact flange is configured to rest against a compressor casing.

A stator damper includes seven damper fingers. The seven damper fingers are spaced evenly along a length of the body section. Each of the damper fingers extends radially outward from an axially aft most end of the body section. Each of the damper fingers is compressibly deformable and configured to be loaded in compression against a compressor casing.

Each of the seven damper fingers has an axially extending section including a flange extending axially aft from the body section and a radial clip portion including a flange extending from an axially aft most end of the axially extending section according to a first clip angle. Each also has a contact flange including an annular flange disposed at an outermost end of the radial clip portion and concentric with the body section.

A gas turbine engine is disclosed. The engine has a compressor casing, a stator assembly, and a stator damper disposed radially outward of the stator assembly and radially inward of the compressor casing. The stator damper is loaded in compression between the compressor casing and the stator assembly.

A method of making a stator damper is recited. The method includes forming a body section having an annular flange. The method also includes forming a damper finger disposed at an axially aft end of the body section and including an axially extending section. Moreover, the method includes bending the damper finger proximate to the axially extending section to form a radial clip portion extending radially from the axially aft most end of the axially extending section. The method further recites forming a contact flange at a radially outermost end of the radial clip portion and configured to be mechanically compressed against a compressor casing.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

With reference to FIGS. 1A-B and 2A-B, a stator damper 2, 2a is installed in a compressor of a gas turbine engine 1. The stator damper 2, 2a is positioned radially outward of a stator assembly 8 and radially inward of a compressor casing 11 relative to an engine central longitudinal axis X-X'. The stator damper 2, 2a is positioned axially between a forward mounting flange 10 and an aft mounting flange 9 of the stator assembly 8.

The forward mounting flange 10 comprises an annular flange extending axially forward from the stator assembly 8 toward the forward direction of the gas turbine engine 1 and the aft mounting flange 9 comprises an annular flange extending axially aft from the stator assembly 8 toward the aft of the gas turbine engine 1.

The forward mounting flange 10 is received by the compressor casing 11. The aft mounting flange 9 is received by the compressor casing 11. In this manner, the stator assembly 8 is retained in mechanical connection to the compressor casing 11 and substantially prevented from axial movement.

The stator damper 2, 2a is compressed between the stator assembly 8 and the compressor casing 11. As such, the stator damper 2, 2a is loaded in compression between the stator assembly 8 and the compressor casing 11. The stator damper 2, 2a exerts a radial reaction force along a path radially inward from the compressor casing 11 through the stator assembly 8. This force results in friction between the mating surfaces. Thus, relative motion (such as radial, axial, and/or tangential excursions) of the stator assembly 8 is substantially damped by the stator damper 2. As used herein, relative motion means radial, axial, and/or tangential excursions of the stator assembly 8 relative to the compressor casing 11 and/or of features of the stator assembly 8 relative to other features of the stator assembly 8.

Figure 3A:
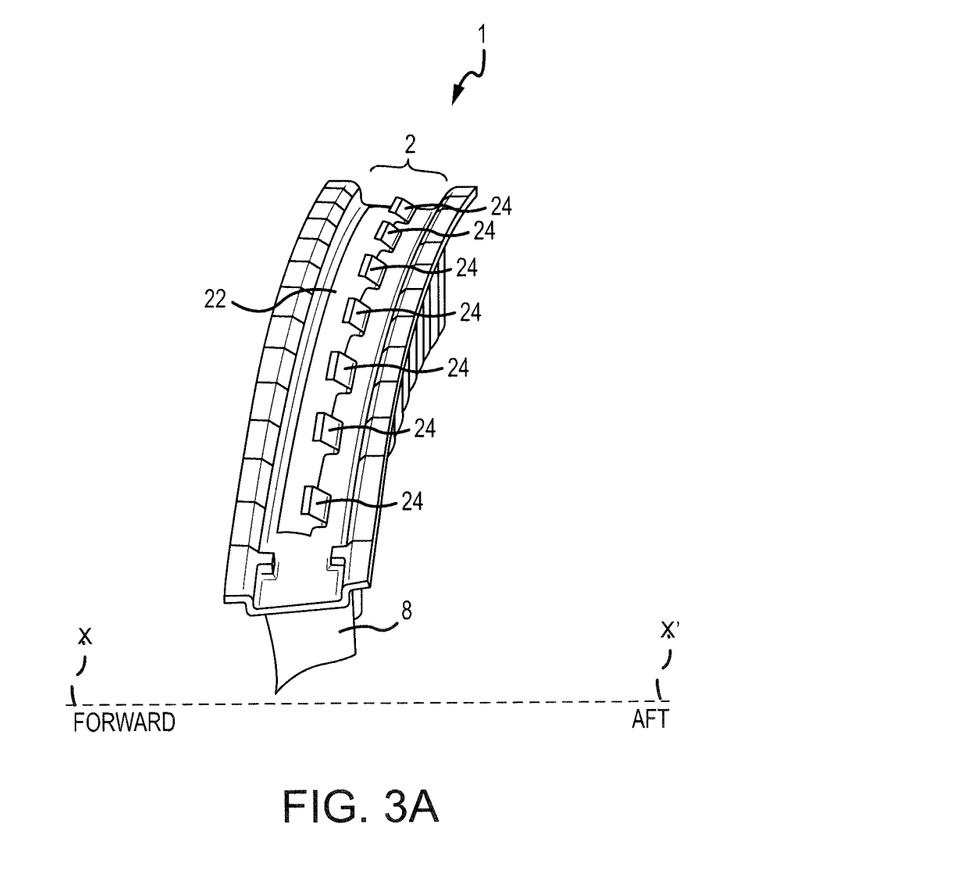
FIG. 3A illustrates an isometric view of an exemplary stator damper.
Figure 3B:
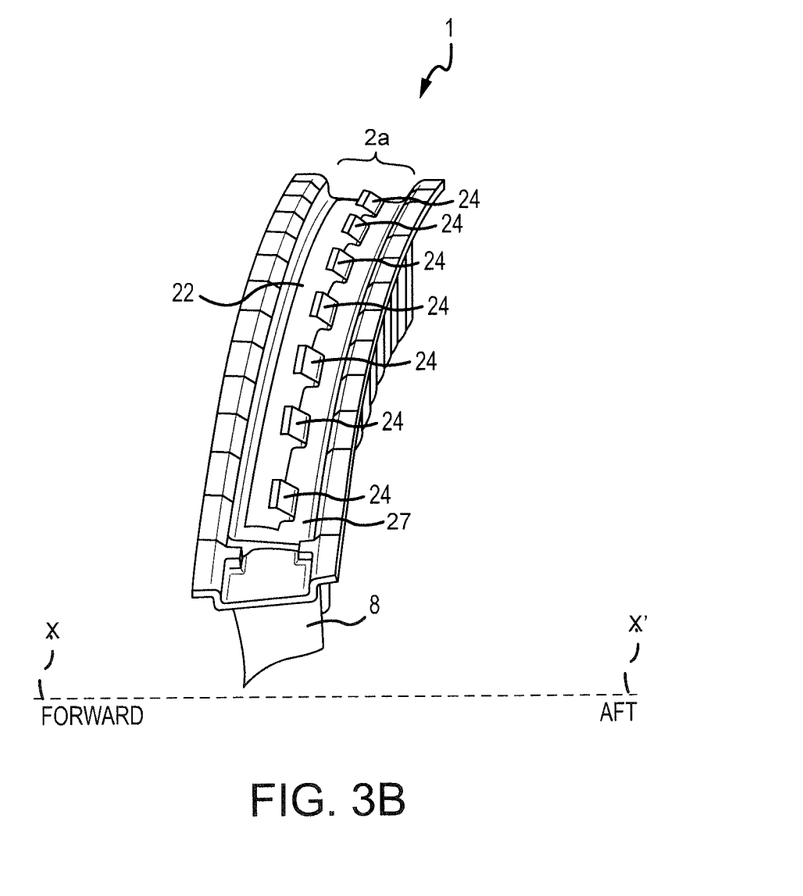
FIG. 3B illustrates an isometric view of an exemplary stator damper with a sealing member.
Figure 4:
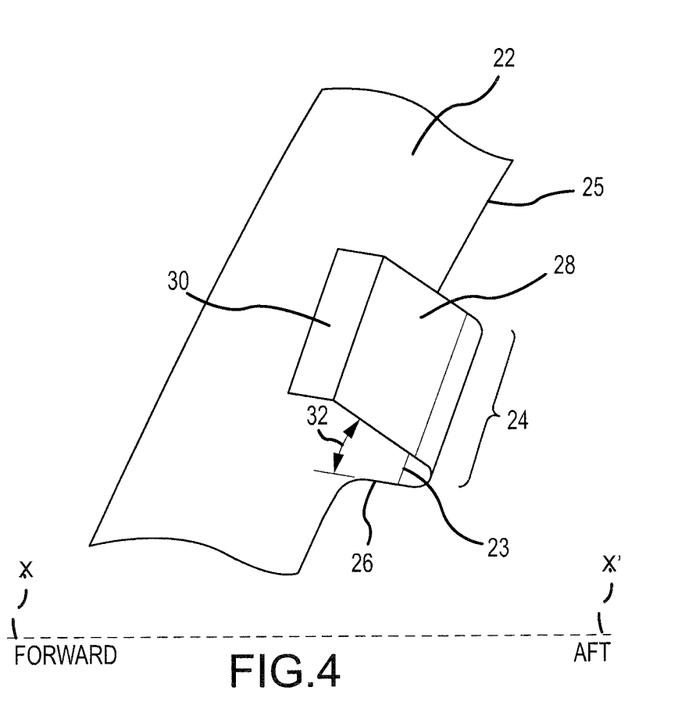
FIG. 4 illustrates a detail view of a damper finger of an exemplary stator damper.

Directing attention now to FIGS. 3A-B and 4, a stator damper 2, 2a comprises various features. More specifically, a stator damper 2, 2a comprises a body section 22 and a damper finger 24. The stator damper 2, 2a comprises a plurality of damper fingers 24. For instance, a stator damper 2, 2a comprises a body section 22 and seven damper fingers 24. The damper fingers 24 are evenly spaced along the length of the body section 22.

With specific reference to FIGS. 3A and 4, a stator damper 2 comprises a body section 22 that comprises an annular cylinder section. For instance, the body section 22 is an annular strip of material configured to lie circumferentially against a stator assembly 8. The body section 22 has an arc length, for instance, and the body section 22 extends for an arc length less than the entire arc length of the stator assembly 8.

With specific reference to FIGS. 3B and 4, a stator damper 2a comprises a body section 22 that comprises an annular cylinder section as discussed above. However, as depicted in FIG. 3B, the body section 22 is configured to lie circumferentially against a sealing member 27, which is configured to lie circumferentially against a stator assembly 8.

Similarly, the sealing member 27 is an annular strip of material configured to lie circumferentially against a stator assembly 8. The sealing member 27 comprises an annular cylinder section radially inward of and co-axial with the body section 22. The sealing member 27 is attached to the body section 22, such as by brazing, welding, integrally forming, and riveting and/or the like. The sealing member 27 has an arc length, for instance, the sealing member 27 has an arc length greater than the arc length of the body section 22. Moreover, the sealing member 27 has an axial length relative to the engine central longitudinal axis. The sealing member 27 has an axial length such that the sealing member 27 extends at least one of axially forward and axially aft of the body section 22. In this manner, sealing member 27 enhances the fluidic seal of the body section 22 to the stator assembly 8.

With reference to FIGS. 3A-B, and 4, each damper finger 24 extends radially outward from the body section 22 and is compressibly deformable, so as to be loaded in compression against a compressor casing 11. Thus, the damper finger 24 is compressed against a compressor casing 11 and exerts a radially inward force against the body section 22, which in turn exerts a radially inward force on the stator assembly 8. Referencing FIGS. 2A-B, such force loads the forward mounting flange 10 and the aft mounting flange 9 of the stator assembly 8 in tension against corresponding portions of the compressor casing 11, damping radial, axial, and tangential movement of the stator assembly 8 (such as in response to resultant friction among surfaces) and ameliorating leakage of gas between the aft mounting flange 9 and the forward mounting flange 10 and the compressor casing 11. Moreover, each damper finger 24 provides a load-bearing surface conducting transient and/or static loads from the stator assembly 8 along a load path through each damper finger 24 and into the compressor casing 11.

In reference to FIG. 4, each damper finger 24 comprises an axially extending section 26, a radial clip portion 28, and a contact flange 30. An axially extending section 26 comprises a flange extending axially aft from the body section 22 and lying co-planar with the body section 22. A radial clip portion 28 comprises a flange extending radially outward from the axially aft most end 23 of the axially extending section 26. The radial clip portion 28 further extends axially forward. Thus, the radial clip portion 28 extends radially away from the axially extending section 26 and axially forward from the axially aft most end 23 of the axially extending section 26, thus forming one side of a first clip angle 32 with the axially extending section 26 forming the second side of the first clip angle 32. As such, the radial clip portion 28 comprises a flange extending from an axially aft most end 23 of the axially extending section 26 according to a first clip angle 32.

Figure 1A:
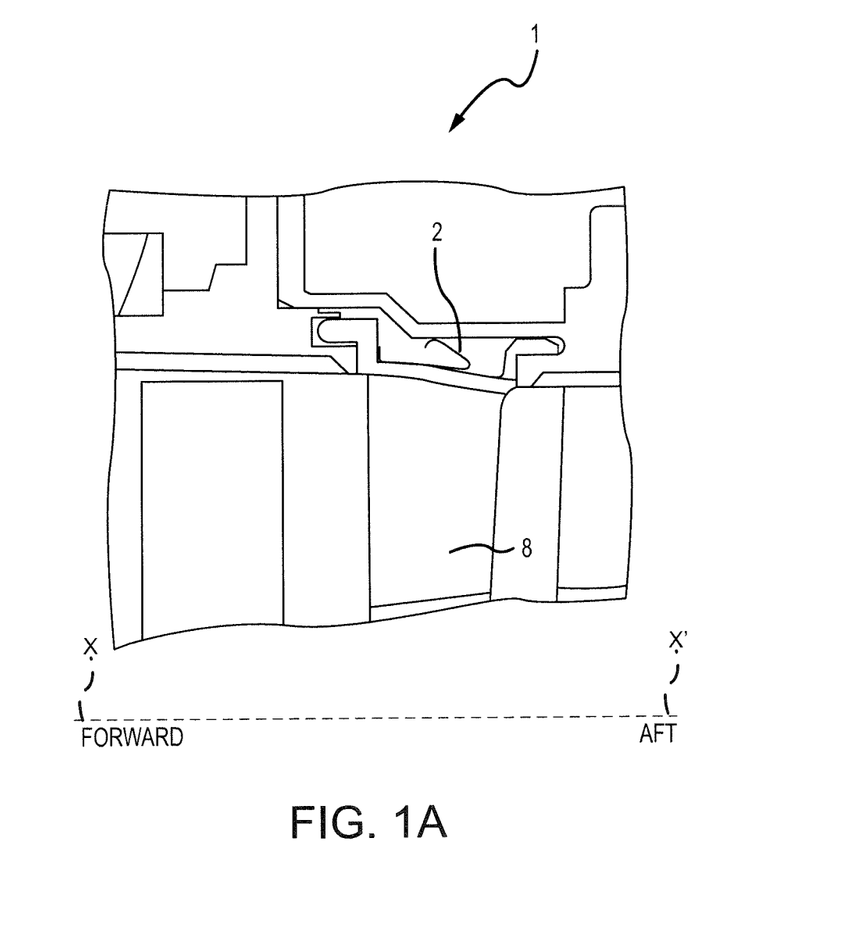
FIG. 1A illustrates a cross-sectional view of an exemplary compressor of a gas turbine engine having a stator damper.
Figure 1B:
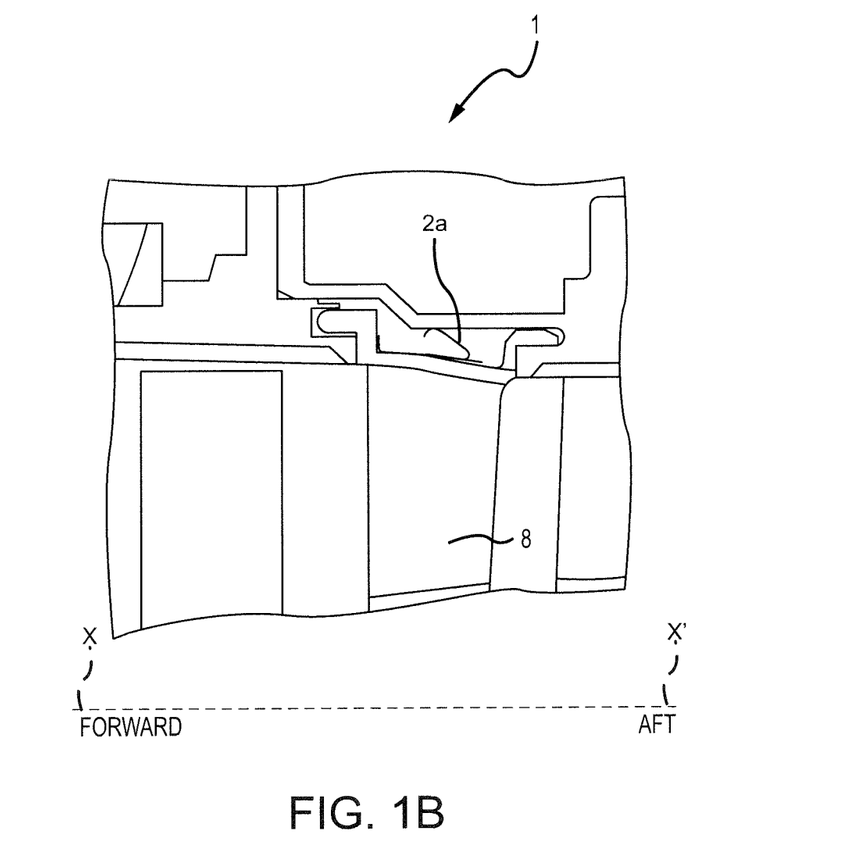
FIG. 1B illustrates a cross-sectional view of an exemplary compressor of a gas turbine engine having a stator damper with a sealing member.
Figure 2A:
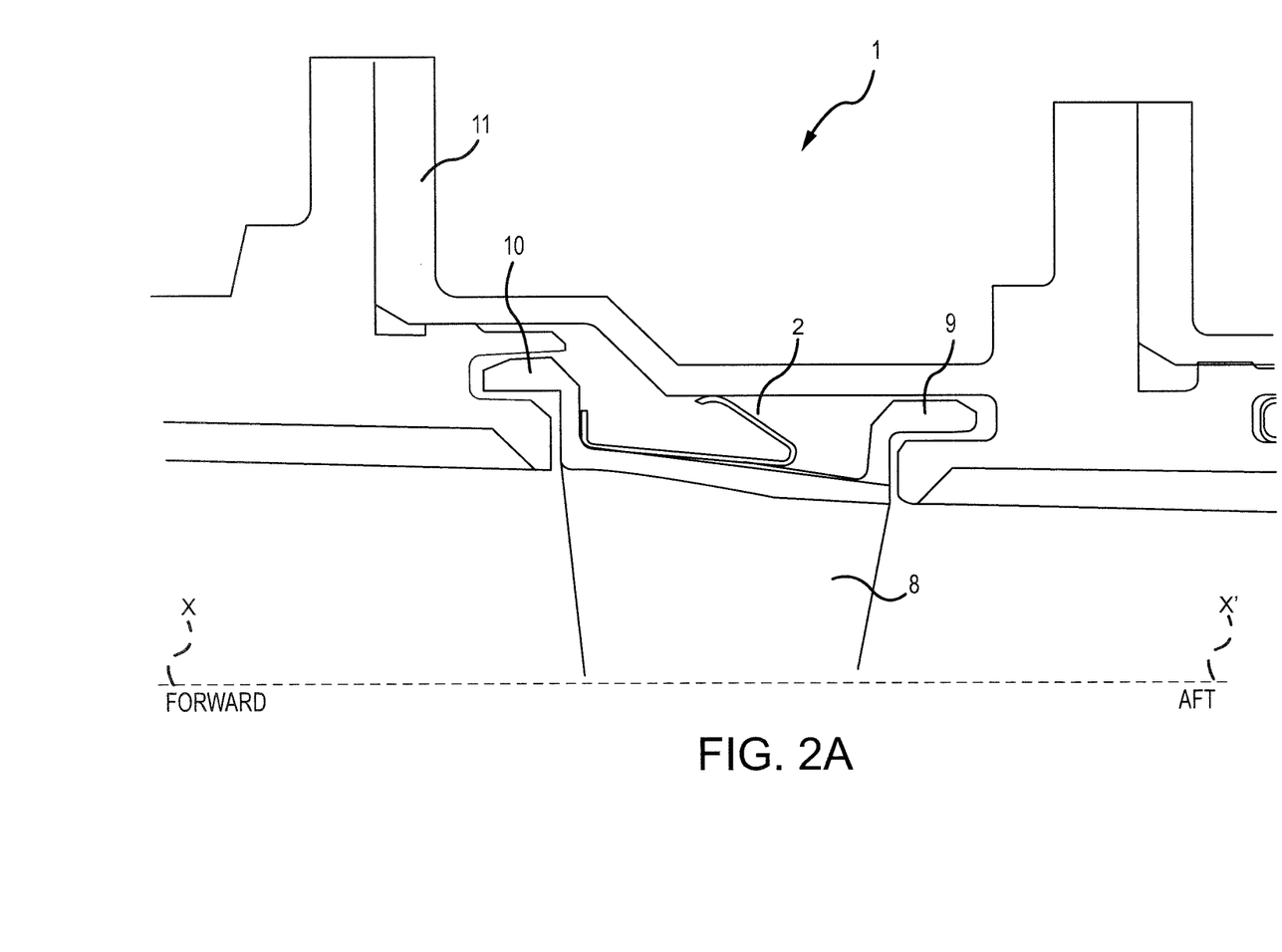
FIG. 2A illustrates a detailed cross-sectional view of an exemplary stator damper installed in an exemplary compressor of a gas turbine engine.
Figure 2B:
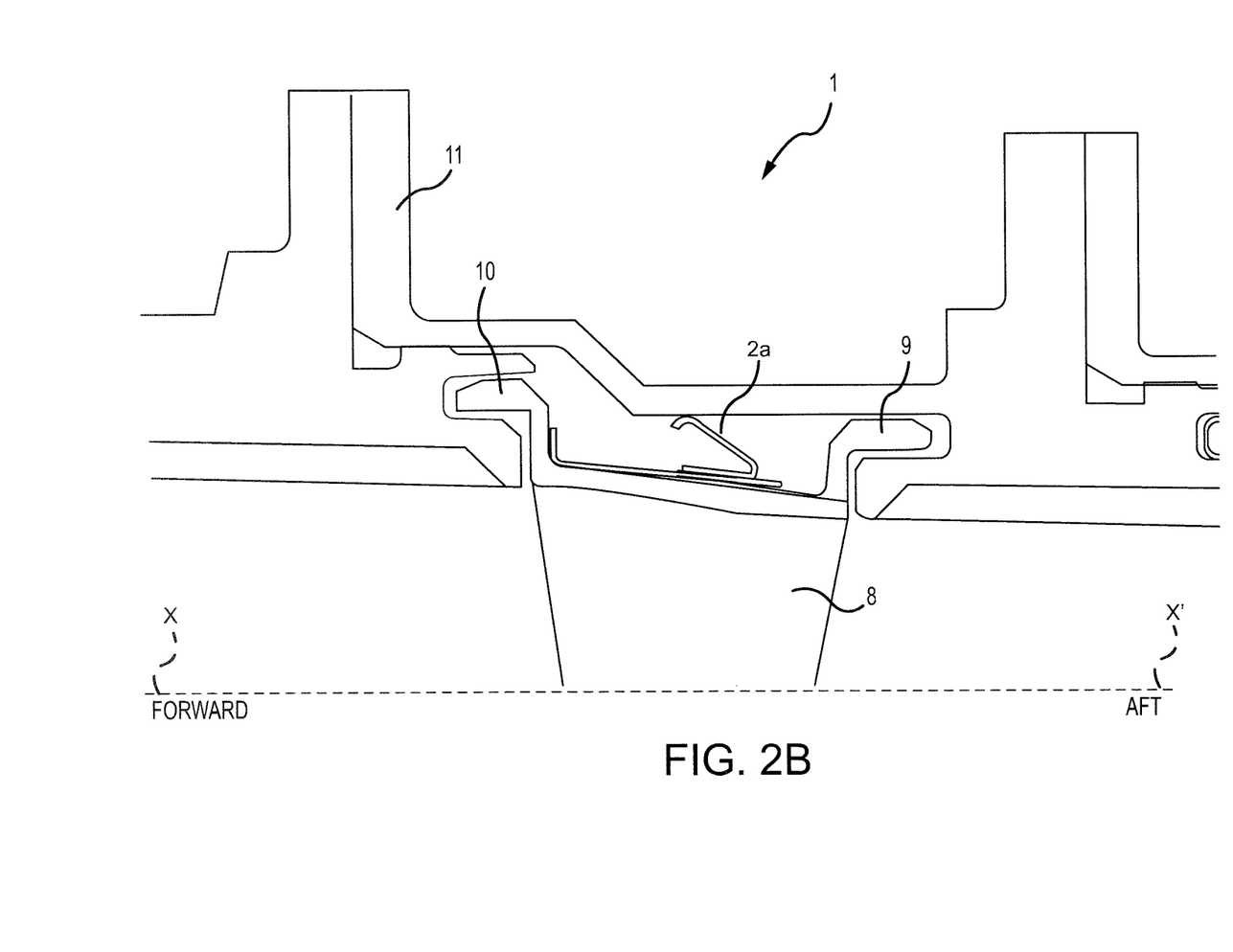
FIG. 2B illustrates a detailed cross-sectional view of an exemplary stator damper with a sealing member installed in an exemplary compressor of a gas turbine engine.

The first clip angle 32 is an acute angle. Accordingly, the radial clip portion 28 is compressible radially toward the axially extending section 26, whereby the damper finger 24 is loaded in compression between the body section 22 and the compressor casing 11 as depicted in FIGS. 1 and 2. Each damper finger 24 further comprises a contact flange 30 comprising an annular flange disposed at a radially outermost end 29 of the radial clip and concentric with the body section 22. The contact flange 30 rests in mechanical contact at the compressor casing 11 as depicted in FIGS. 1A-2B.

Methods of forming a stator damper 2, are also presented. For instance, with reference to FIGS. 1-4 and 5A, a method 500 includes forming a body section 22 comprising an annular flange (step 502). The method 500 further includes forming a damper finger 24 that is disposed at an axially aft end 25 of the body section 22, the damper finger 24 comprising an axially extending section 26 (step 504). The method 500 further includes bending the damper finger 24 proximate to the axially extending section 26 to form a radial clip portion 28 extending radially from the axially aft most end 23 of the axially extending section 26 (step 506). Finally, the method 500 includes forming a contact flange 30 at a radially outermost end 29 of the radial clip portion 28 and configured to be mechanically compressed against a compressor casing 11 (step 508). The steps are carried out in parallel, or in sequences as desired.

Figure 5A:
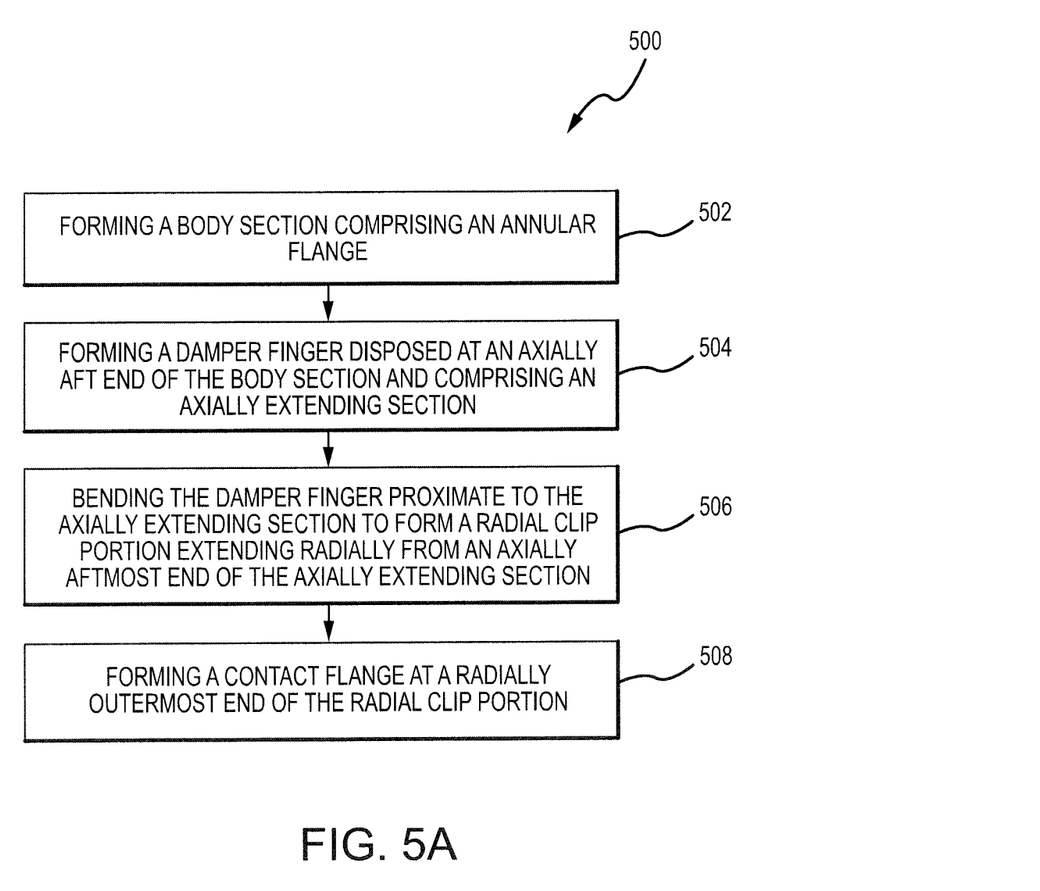
FIG. 5A depicts a method of making an exemplary stator damper.
Figure 5B:
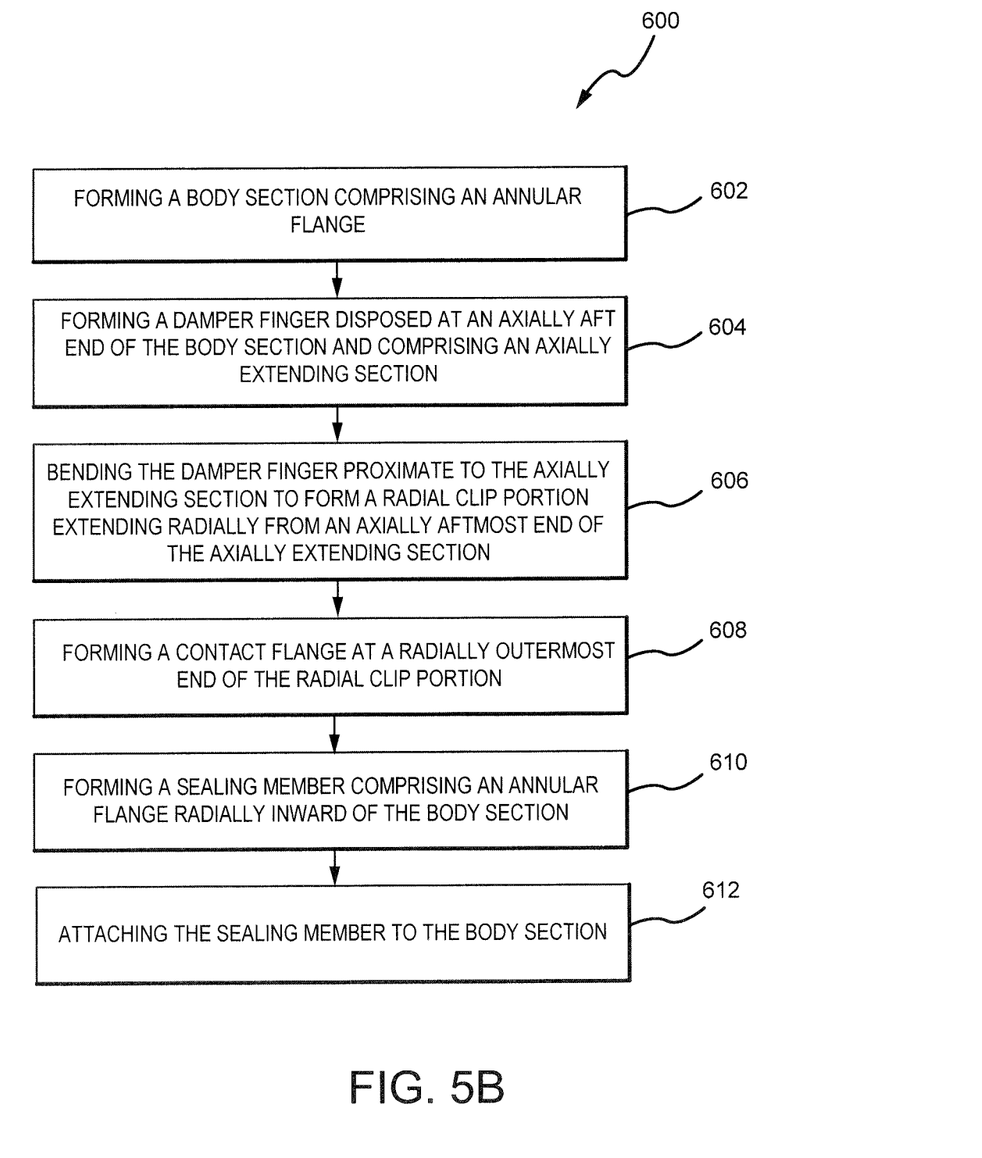
FIG. 5B depicts a method of making an exemplary stator damper with a sealing member.

Methods of forming a stator damper 2a, are also presented. For instance, with reference to FIGS. 1-4 and 5B, a method 600 includes forming a body section 22 comprising an annular flange (step 602). The method 600 further includes forming a damper finger 24 that is disposed at an axially aft end 25 of the body section 22, the damper finger 24 comprising an axially extending section 26 (step 604). The method 600 further includes bending the damper finger 24 proximate to the axially extending section 26 to form a radial clip portion 28 extending radially from the axially aft most end 23 of the axially extending section 26 (step 606). The method 600 includes forming a contact flange 30 at a radially outermost end 29 of the radial clip portion 28 and configured to be mechanically compressed against a compressor casing 11 (step 608). Finally, the method 600 includes forming a sealing member 27 comprising an annular flange radially inward of the body section 22 (step 610)

and attaching the sealing member 27 to the body section 22 (step 612). The sealing member 27 is attached to the body section 22 by at least one of brazing, welding, integrally forming, riveting, and the like. The steps are carried out in parallel, or in sequences as desired.

Having discussed aspects of a stator damper 2, 2a, a stator damper 2, 2a is made of a single material, or different materials, or combinations of materials. For example, components of the system are made from metal. For example, aspects of a stator damper 2, 2a are metal, such as nickel, stainless steel, cobalt, or titanium, though it alternatively comprises numerous other materials configured to provide support. Components of the system are optionally made from other materials such as, for example, composite, ceramic, plastics, polymers, alloys, glass, binder, epoxy, polyester, acrylic, or any material or combination of materials having desired material properties, such as heat tolerance, strength, stiffness, or weight. Portions of a stator damper 2, 2a as disclosed herein are optionally made of different materials or combinations of materials, and/or comprise coatings. Moreover, components of the stator damper 2, 2a are in some instances mixtures of different materials according to different ratios, gradients, and the like.

A stator damper 2, 2a thus has multiple materials, or any material configuration suitable to enhance or reinforce the resiliency and/or support of the system when subjected to wear in an aircraft operating environment or to satisfy other desired electromagnetic, chemical, physical, or material properties, for example coefficient of thermal expansion, ductility, weight, flexibility, strength, or heat tolerance.

One such material is an austenitic nickel-chromium-based alloy such as Inconel®, which is available from Special Metals Corporation of New Hartford, N.Y., USA. Other such material includes ceramic matrix composite (CMC). Further material includes refractory metal, for example, an alloy of titanium, such as, titanium-zirconium-molybdenum (TZM).

Benefits, other advantages, and solutions to problems have been described herein with regard to specific embodiments. The scope of the disclosure, however, is provided in the appended claims.

The invention claimed is:

1. A stator damper, of a stator assembly disposed in a compressor casing of a gas turbine engine, the stator damper comprising: a body section comprising an annular cylinder section; a damper finger extending radially outward from the body section and comprising: an axially extending section comprising a flange extending axially aft from the body section; and a radial clip portion comprising a flange extending from an axially aft most end of the axially extending section according to a first clip angle; and a sealing member attached to the body section and disposed against a stator assembly of the gas turbine engine, the sealing member comprising an annular cylinder section radially inward of and co-axial with the body section, wherein the sealing member has an arc length that is greater than an arc length of the body section; wherein the damper finger is loaded in compression against the compressor casing of the gas turbine engine, and whereby the stator damper exerts a radial force along a path radially inward from the compressor casing through the stator assembly of the gas turbine engine, whereby relative motion of the stator assembly is damped.

2. The stator damper according to claim 1,
wherein the first clip angle is an acute angle, and
wherein the axially extending section is coplanar with the body section.

3. The stator damper according to claim 1, wherein the damper finger further comprises a contact flange comprising an annular flange disposed at a radially outermost end of the radial clip portion and being concentric with the body section.

4. The stator damper according to claim 3, wherein the contact flange is configured to rest against a compressor casing.

5. The stator damper according to claim 1, comprising seven damper fingers.

6. The stator damper according to claim 5, wherein the seven damper fingers are spaced evenly along an arc length of the body section.

7. The stator damper according to claim 1, further comprising a plurality of damper fingers.

8. The stator damper according to claim 7, wherein each of the plurality of damper fingers extends radially outward from an axially aft end of the body section.

9. The stator damper according to claim 7, wherein each of the plurality of damper fingers is compressibly deformable and configured to be loaded in compression against a compressor casing.

10. The stator damper according to claim 9, wherein each of the plurality of damper fingers comprises:
an axially extending section comprising a flange extending axially aft from the body section; and
a radial clip portion comprising a flange extending from the axially aft most end of the axially extending section according to the first clip angle.

11. The stator damper according to claim 10, wherein each of the plurality of damper fingers further comprising a contact flange comprising an annular flange disposed at a radially outermost end of the radial clip portion and concentric with the body section.

12. A gas turbine engine comprising: a compressor casing; a stator assembly; a stator damper disposed radially outward of the stator assembly and radially inward of the compressor casing; and a sealing member attached to the stator damper and disposed against the stator assembly of the gas turbine engine, the sealing member comprising an annular cylinder section radially inward of and co-axial with the stator damper, wherein the sealing member has an arc length that is greater than an arc length of the stator damper; wherein the stator damper is loaded in compression between the compressor casing and the stator assembly.

13. The gas turbine engine according to claim 12, wherein the stator damper comprises:
a body section comprising an annular cylinder section; and
a plurality of damper fingers extending radially outward from the body section.

14. The stator damper according to claim 13, wherein each damper finger comprises:
an axially extending section comprising a flange extending axially aft from the body section; and
a radial clip portion comprising a flange extending from an axially aft most end of the axially extending section according to a first clip angle.

15. The stator damper according to claim 14, wherein the first clip angle is an acute angle.

16. The stator damper according to claim 15, wherein the axially extending section is coplanar with the body section.

17. The stator damper according to claim 16, wherein each damper finger further comprises a contact flange comprising an annular flange disposed at a radially outermost end of the radial clip portion and concentric with the body section.

18. A method of making a stator damper comprising: forming a body section comprising an annular flange; forming a damper finger disposed at an axially aft end of the body section and comprising an axially extending section; attaching a sealing member to the body section of the stator damper, wherein the sealing member has an annular cylinder section radially inward of and co-axial with the stator damper and an arc length that is greater than an arc length of the body section of the stator damper; and bending the damper finger proximate to the axially extending section to form a radial clip portion extending radially from an axially aft most end of the axially extending section.

19. The method according to claim 18, further comprising forming a contact flange at a radially outermost end of the radial clip portion and configured to be mechanically compressed against a compressor casing.

\* \* \* \* \*